(12) United States Patent
Yesilcimen et al.

(10) Patent No.: US 11,220,961 B2
(45) Date of Patent: Jan. 11, 2022

(54) TURBOMACHINE ASSEMBLY

(71) Applicant: SAFRAN AIRCRAFT ENGINES, Paris (FR)

(72) Inventors: Henri Yesilcimen, Moissy-Cramayel (FR); Pascal Charles Edouard Coat, Moissy-Cramayel (FR); Julien Discart, Moissy-Cramayel (FR); Nicolas Jerome Jean Tantot, Moissy-Cramayel (FR); Jean Charles Olivier Roda, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 199 days.

(21) Appl. No.: 16/664,430

(22) Filed: Oct. 25, 2019

(65) Prior Publication Data
US 2020/0141329 A1   May 7, 2020

(30) Foreign Application Priority Data
Oct. 25, 2018 (FR) ...................... 1871308

(51) Int. Cl.
*F02C 7/36* (2006.01)
*F02K 3/06* (2006.01)
(Continued)

(52) U.S. Cl.
CPC ................. *F02C 7/36* (2013.01); *F02K 3/06* (2013.01); *F02C 7/32* (2013.01);
(Continued)

(58) Field of Classification Search
CPC ...... F02C 7/32; F02C 7/36; F02C 5/06; F02C 5/08; F02K 3/06; F05D 2220/323;
(Continued)

(56) References Cited

U.S. PATENT DOCUMENTS 2,468,157 A * 4/1949 Barlow ................... F02B 37/20
                                              416/125
3,007,302 A * 11/1961 Vincent .................. F02B 41/10
                                              60/598

(Continued)

FOREIGN PATENT DOCUMENTS

EP    2009269 A2   12/2008
GB    2263308 A    7/1993

OTHER PUBLICATIONS

Preliminary Research Report received for French Application No. 1871308, dated Jul. 9, 2019, 3 pages (1 page of French Translation Cover Sheet and 2 pages of original document).

*Primary Examiner* — Mark A Laurenzi
*Assistant Examiner* — Loren C Edwards
(74) *Attorney, Agent, or Firm* — Womble Bond Dickinson (US) LLP (57) ABSTRACT

The invention relates to a turbomachine assembly (1) comprising:
  a compressor (30),
  an isobaric combustion chamber (40),
  a piston engine (7) comprising:
    a shell (70), and
    a piston (72) movably mounted inside the shell (70) and defining with the shell (70) a variable-volume piston chamber (74),
  a turbine (50), and
  a differential transmission mechanism (8).

13 Claims, 6 Drawing Sheets

(51) Int. Cl.
*F02C 7/32* (2006.01)
*F16H 57/04* (2010.01)
*F16H 57/08* (2006.01)

(52) U.S. Cl.
CPC .... *F05D 2220/323* (2013.01); *F05D 2220/36* (2013.01); *F05D 2230/60* (2013.01); *F05D 2240/62* (2013.01); *F05D 2260/40311* (2013.01); *F16H 57/0479* (2013.01); *F16H 57/0482* (2013.01); *F16H 57/082* (2013.01)

(58) Field of Classification Search
CPC ............. F05D 2220/36; F05D 2240/62; F05D 2260/40311; F16H 57/0479; F16H 57/0482; F16H 57/082; F02B 37/10; F02B 37/105; F01D 13/00; F01D 15/12
See application file for complete search history.

(56) References Cited

U.S. PATENT DOCUMENTS

| | | | |
|---|---|---|---|
| 3,280,554 | A | 10/1966 | Knowles |
| 3,673,797 | A * | 7/1972 | Wilkinson ............. F02D 25/00 60/600 |
| 4,449,370 | A | 5/1984 | Ream |
| 2005/0150219 | A1 | 7/2005 | Crawley et al. |
| 2015/0198335 | A1* | 7/2015 | Kim ......................... F23R 3/54 60/760 |
| 2015/0285130 | A1* | 10/2015 | Labedan ................. F02B 33/40 60/598 |
| 2015/0361877 | A1 | 12/2015 | Gulen |
| 2015/0377108 | A1 | 12/2015 | Fiveland et al. |

* cited by examiner

TURBOMACHINE ASSEMBLY

FIELD OF THE INVENTION

The invention relates to a turbomachine assembly.

The invention aims more specifically a turbomachine assembly comprising a piston engine.

STATE OF THE ART

Figure 1:
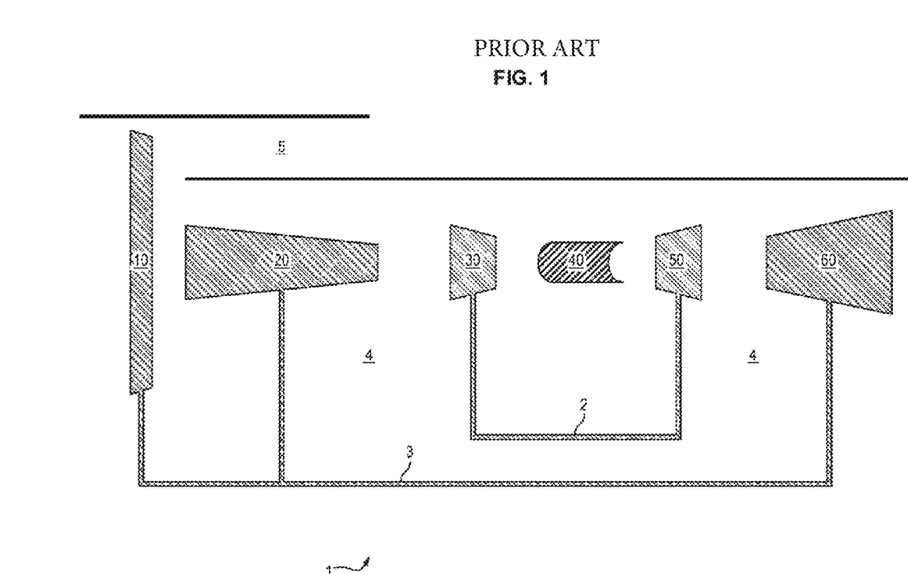

With reference to FIG. 1, a known turbomachine 1 comprises, from upstream to downstream with respect to the direction of air flow within said turbomachine 1 in operation, a fan 10, a low-pressure compressor 20, a high-pressure compressor 30, a combustion chamber 40, a high-pressure turbine 50 and a low-pressure turbine 60. The high-pressure compressor 30 and the high-pressure turbine 50 form a high-pressure spool 2, and the low-pressure compressor 20 and the low-pressure turbine 60 form a low-pressure spool 3.

In operation, the air taken by the fan 10 is distributed between a primary stream 4, circulating through the high-pressure spool 2 and the low-pressure spool 3, and a secondary stream 5, circulating around the high-pressure spool 2 and the low-pressure spool 3. The primary stream 4 is compressed through the compressors 20, 30, then combusted within the combustion chamber 40, to be finally expanded in the turbines 50, 60. The turbines 50, 60 drive in rotation both the fan 10 and the compressors 20, 30.

Most of the recent improvements in such a turbomachine 1 have focused on the optimization of its thermodynamic cycle, called Brayton cycle. By lowering the pressure ratio of the fan 10 and, accordingly, by increasing the bypass ratio (i.e. the ratio of the mass of the secondary stream 5 to the air mass of the primary stream 4) and/or the compression ratio (i.e. the ratio between the total pressure upstream and downstream of the fan 10 and the compressors 20, 30), it has been observed increases in the propulsive efficiency and/or in the thermal efficiency.

However, such improvements are partly degraded by increases in mass and aerodynamic drag. There is therefore a need for improving existing turbomachines, in particular with a view to reducing their consumption.

In this respect, it has already been envisaged to modify the shape of the Brayton cycle, by combination of a constant-pressure combustion and of a constant-volume combustion, in order to improve the efficiency of a turbomachine. Thus, it has for example been proposed to integrate a piston engine to a turbomachine, as in the Napier Nomad engine or as described in document GB760005. Indeed, such an engine offers the advantage of carrying out a partially constant-volume combustion, which is more effective than the constant-pressure combustion of the combustion chamber of a turbomachine. On the other hand, such an engine has a specific power (i.e., referred to the unit mass) lower than a combustion chamber of a turbomachine, and suffers from numerous limitations as to its implementation at high altitude, and/or to highly variable speeds, and/or during significant loads at start-up. For example, by adding such an engine, it is necessary to be able to make compatible the variability of the high-pressure compressor speed, dictated by the overall balance of the turbomachine, with the stability of the speed of a piston engine, dictated by the continuity of the air flow rate passing therethrough.

There is therefore a need for effectively integrating a piston engine within a turbomachine with a view to improving consumption.

SUMMARY OF THE INVENTION

One of the objects of the invention is to improve the specific fuel consumption of a turbomachine.

Another object of the invention is to reduce the mass of the components of a turbomachine.

Another object of the invention is to effectively integrate a piston engine, comprising a multiple number of shells and pistons, within a turbomachine.

Another object of the invention is to ensure the aerodynamic coupling between, on the one hand, a piston engine comprising a multiple number of shells and pistons and, on the other hand, the high-pressure compressor and the combustion chamber of a turbomachine.

In this regard, the invention relates to a turbomachine assembly comprising:
  a compressor,
  a compressor shaft configured to drive in rotation the compressor,
  a piston engine comprising:
    a shell, and
    a piston movably mounted inside the shell and defining with the shell a variable-volume piston chamber,
  a crankshaft configured to be driven in rotation by the piston engine,
  an isobaric combustion chamber,
  a turbine,
  a turbine shaft configured to be driven in rotation by the turbine,
  a differential transmission mechanism comprising:
    a first rotary part connected to the compressor shaft,
    a second rotary part connected to the crankshaft, and
    a third rotary part connected to the turbine shaft,
  the rotary parts cooperating with each other so as to transmit to the compressor shaft a rotational movement at a first velocity which depends:
    on a second rotational velocity of the crankshaft and
    on a third rotational velocity of the turbine shaft.

Thanks to such an assembly, it is possible to effectively integrate a piston engine within a turbomachine. Indeed, thanks to the differential transmission mechanism, the respective speeds of the piston engine and of the compressor can change independently of each other. Thus, the turbine of such an assembly is able to operate at the same speeds as in the absence of the combustion engine, while reaching lower consumption levels. Finally, the second combustion of the gases burned by the piston engine in the isobaric combustion chamber leads to a reduction in the emitted amount of nitrogen oxides.

Advantageously, but optionally, the assembly according to the invention may further comprise at least one of the following characteristics, taken alone or in combination:
  the differential transmission mechanism comprises a first epicyclic gear train,
  the first epicyclic gear train comprises a first ring gear and a first sun gear, the first ring gear forming the second rotary part of the transmission mechanism and the first sun gear forming the first rotary part of the differential transmission mechanism,
  the first epicyclic gear train comprises a first planet carrier, the first planet carrier forming the third rotary part of the differential transmission mechanism, the first epicyclic gear train comprises a first planet carrier, and the differential transmission mechanism comprises a reduction gear including the third rotary part, the first planet carrier being connected to the turbine shaft via the reduction gear, the piston engine further comprises:
an intake duct configured to take air coming from the compressor in the variable-volume piston chamber,
a discharge duct configured to discharge gases coming from the variable-volume piston chamber toward the isobaric combustion chamber,
it comprises a primary air circulation duct configured to guide air coming from the compressor up to the isobaric combustion chamber,
the piston engine comprises a plurality of shells and a plurality of pistons, preferably between 6 and 24 pistons, each piston being movable within a shell of the plurality of shells, the plurality of shells and the plurality of pistons defining a plurality of variable-volume piston chambers, and
it further comprises a plenum chamber configured to facilitate a passage from a continuous gas flow through the compressor and/or the turbine to a discontinuous gas flow through the piston engines.

The invention also relates to a turbomachine comprising an assembly as previously described.

Advantageously, but optionally, the assembly as previously described, and/or the turbomachine as previously described, may further comprise at least one of the following characteristics, taken alone or in combination:
the turbomachine is configured to be mounted on a short or medium-haul type aircraft, that is to say of the type developing a thrust comprised between 100 and 135 kN,
a bypass ratio of the turbomachine is comprised between 12 and 18,
the turbomachine further comprises a fan whose compression ratio, during cruising and/or take-off operation, is comprised between 1.3 and 1.5,
a compression ratio of the high-pressure compressor is comprised between 15 and 25,
the turbomachine further comprises a fan, whose speed is comprised between 2,500 and 4,000 revolutions per minute,
a peripheral velocity of the fan is comprised between 300 and 420 meters per second,
a speed of the high-pressure compressor is comprised between 15,000 and 20,000 revolutions per minute,
it comprises a heat exchanger disposed upstream of the piston engine,
the piston engine is cooled by means of an air-oil exchanger,
it further comprises a positive-displacement pump configured to increase the intake pressure within the piston engine,
the combustion engine has dimensions such that the excess air taken by the secondary combustion chamber is comprised between 4 and 12, preferably comprised between 8 and 12,
a bore of the piston is comprised between 150 and 250 millimeters,
a stroke of the piston is comprised between 150 and 250 millimeters,
a volumetric ratio of the combustion engine is comprised between 2 and 5, in operation, an average linear velocity of the piston inside the cylinder is comprised between 5 and 20 meters per second,
in operation, a maximum pressure reached within the shell of the piston engine is comprised between 150 and 250 bars,
a power developed by the combustion engine in operation is comprised between 500 kW and 2 MW,
a speed of the combustion engine shaft, in operation, is comprised between 1,000 and 4,000 revolutions per minute,
a reduction ratio of the first epicyclic gear train is comprised between 2 and 3, and
a geometric coefficient of the reduction gear is comprised between 1.25 and 2.

DESCRIPTION OF THE FIGURES

Other characteristics, objects and advantages of the invention will become apparent from the following description which is purely illustrative and non-limiting and which should be read in light of the appended drawings wherein:

FIG. 1, already described, schematically illustrates a turbomachine known from the prior art, FIG. 2 schematically illustrates a turbomachine comprising a first exemplary embodiment of an assembly according to the invention, FIG. 3 schematically illustrates a turbomachine comprising a second exemplary embodiment of an assembly according to the invention, FIG. 4 schematically illustrates a turbomachine comprising a third exemplary embodiment of an assembly according to the invention.

DETAILED DESCRIPTION OF THE INVENTION

Turbomachine

Figure 2:
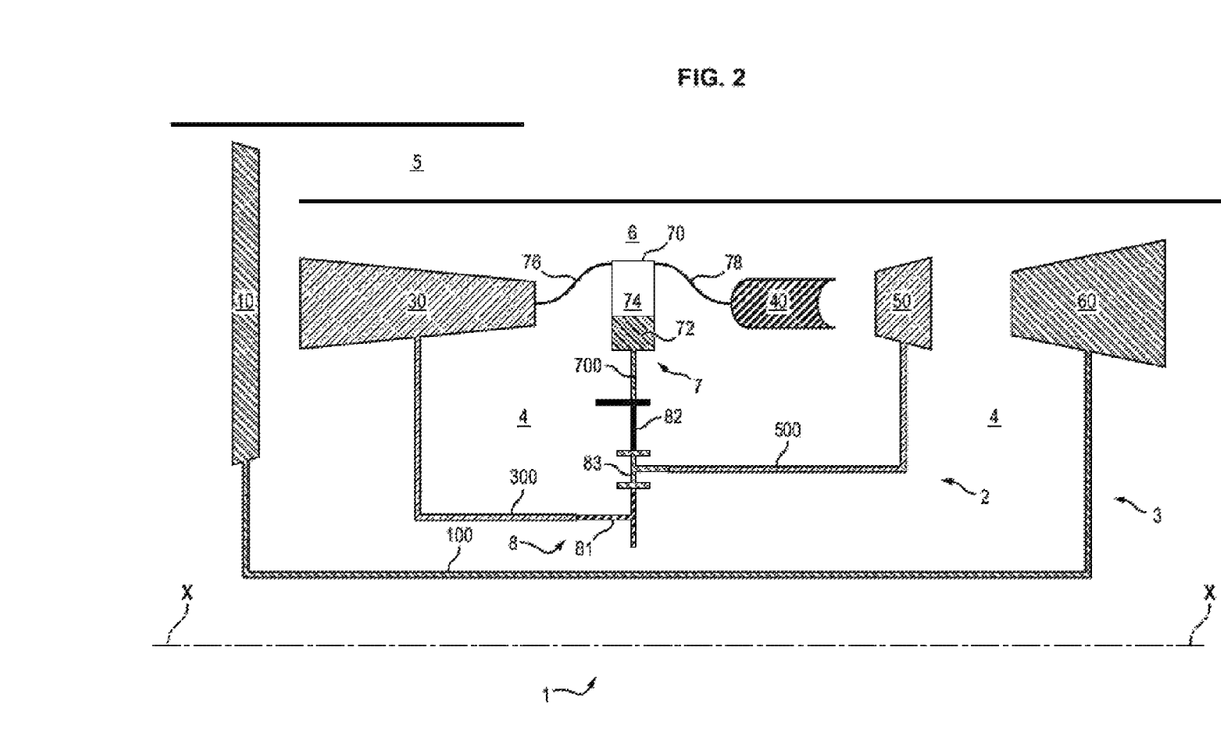
Figure 3:
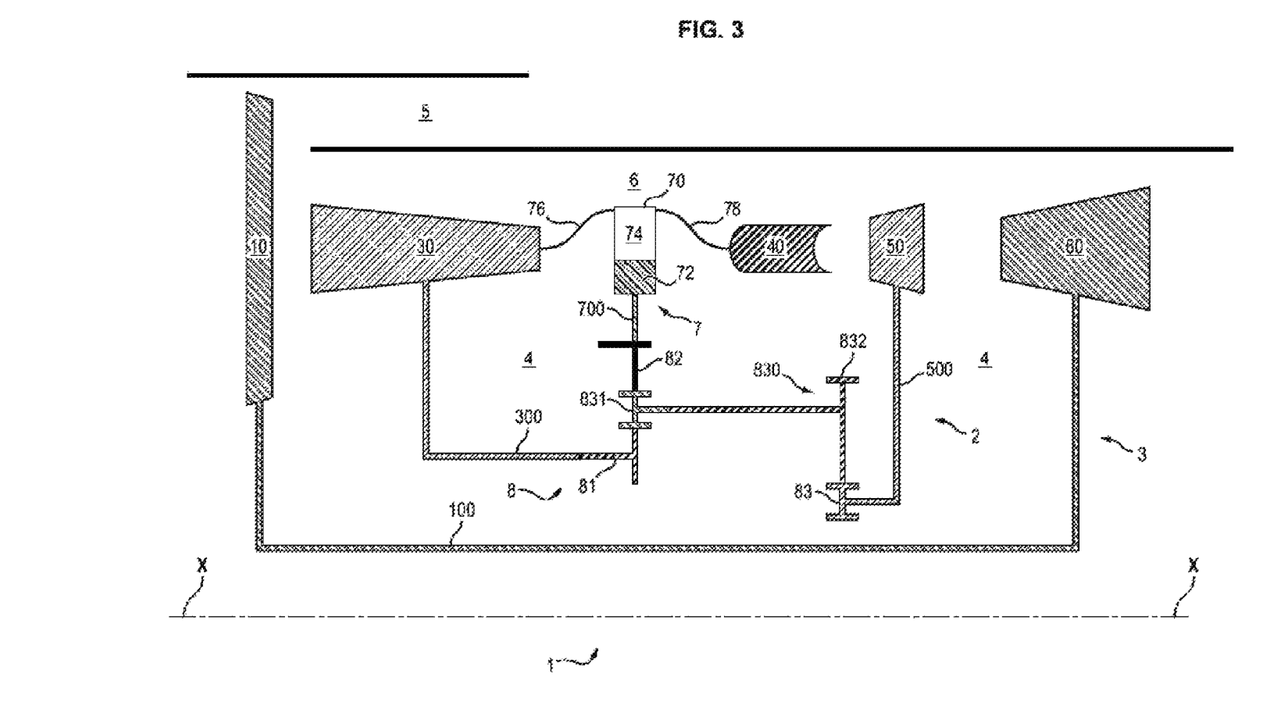
Figure 4:
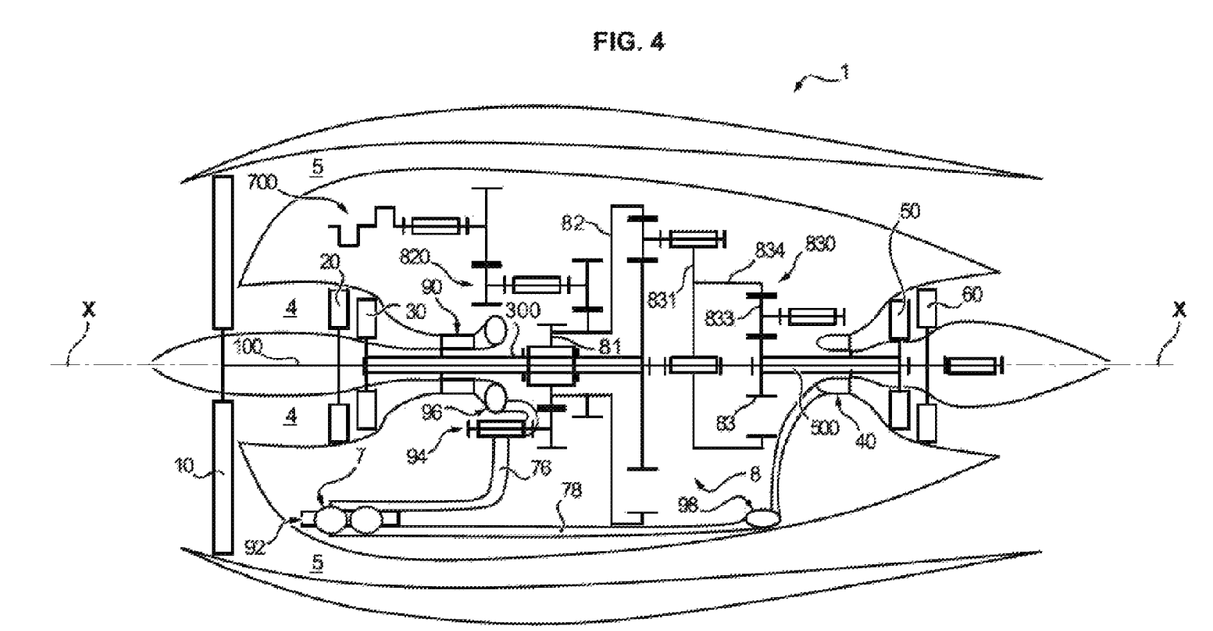

With reference to FIGS. 2 to 4, a turbomachine 1 comprises a compressor 30 and a compressor shaft 300 configured to drive the compressor 30 in rotation about a longitudinal axis X-X of the turbomachine 1. The turbomachine 1 further comprises a turbine 50 and a turbine shaft 500 configured to be driven in rotation by the turbine 50 about the longitudinal axis X-X. As can be seen in FIGS. 2 to 4, an isobaric (i.e. constant-pressure) combustion chamber 40 is also arranged between the compressor 30 and the turbine 50. The turbomachine 1 then advantageously comprises a primary circulation duct 6 configured to guide air coming from the compressor 30 up to the isobaric combustion chamber 40.

As can also be seen in FIGS. 2 to 4, the turbomachine 1 may comprise a fan 10 driven in rotation by a fan turbine 60, by means of a fan shaft 100. Advantageously, the fan turbine 60 is disposed downstream the turbine 50, with respect to the direction of air flow within the turbomachine 1. In the following, the upstream and the downstream are moreover defined with respect to the direction of air flow within the turbomachine 1 in operation. Also advantageously, the turbomachine 1 may further comprise an additional compressor 20 disposed downstream of the fan 10 and upstream of the compressor 30. This additional compressor 20 is also driven in rotation by the fan turbine 60, by means of the fan shaft 100. In this case, the fan 10, the additional compressor 20 and the fan turbine 60 form a first spool 3, while the compressor 30 and the turbine 50 form a second spool 2. In one embodiment, the additional compressor 20 is a low-pressure compressor, the compressor 30 is a high-pressure compressor, the turbine 50 is a high-pressure turbine, and the fan turbine 60 is a low-pressure turbine. The fan 10, the low-pressure compressor 20 and the low-pressure turbine 60 then form the low-pressure spool 3, while the high-pressure compressor 30 and the high-pressure turbine 50 form the high-pressure spool 2.

Piston Engine

The turbomachine 1 further comprises a piston engine 7 which comprises:
- a shell 70, and
- a piston 72 movably mounted inside the shell 70.

The piston 72 and the shell 70 define a variable-volume piston chamber 74. The piston engine 7 operates by iso-choric (i.e. constant-volume) combustion preferably in two-stroke or alternatively four-stroke mode. It can also be of any type: diesel engine, gasoline engine, Wankel-type engine, etc.

Advantageously, the piston engine 7 further comprises:
- an intake duct 76 configured to take air coming from the compressor 30 in the variable-volume piston chamber 74, and
- a discharge duct 78 configured to discharge gases coming from the variable-volume combustion chamber 74 toward the isobaric combustion chamber 40.

In addition, the piston engine 7 may comprise:
- one (or several) fuel injection nozzle(s) (not represented) opening into the variable-volume piston chamber 74, and configured to inject fuel therein, and
- when the piston engine 7 is a gasoline engine, one (or several) spark plug(s) (not represented) also opening into the variable-volume piston chamber 74, and configured to produce one (or several) spark(s) intended to ignite the content of the variable-volume piston chamber 74.

In any case, the turbomachine 1 also comprises a crankshaft 700, configured to be driven in rotation by the piston engine 7. This crankshaft 700 may, for example, be configured to transform a straight linear movement of the piston 72 within the shell 70, into a rotational movement. This is however not limiting, since the crankshaft 700 can also be driven in rotation by rotation of the piston 72 within the shell 70, typically when the piston engine 7 is of the Wankel type.

Advantageously, the combustion engine 7 comprises a plurality of shells 70 and a plurality of pistons 72, preferably between 6 and 24, each piston 72 being movable within a shell 70 of the plurality of shells 70, the plurality of shells 70 and the plurality of pistons 72 defining a plurality of variable-volume piston chambers 74. In this case, the intake duct 76 is also configured to take air coming from the compressor 30 in each variable-volume piston chamber 74 of the plurality of variable-volume piston chambers 74, and the discharge duct 78 is also configured to discharge gases coming from each variable-volume piston chamber 74 of the plurality of variable-volume combustion chambers 74 toward the isobaric combustion chamber 40.

Figure 5:
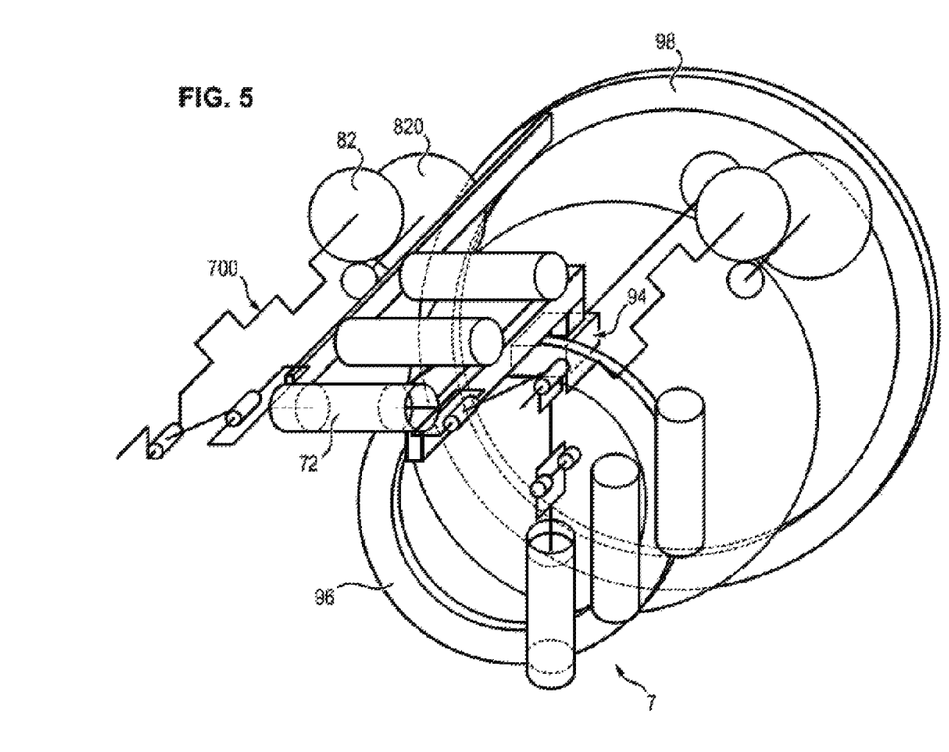
FIG. 5 is a perspective view of a portion of a turbomachine comprising a fourth exemplary embodiment of an assembly according to the invention.
Figure 6:
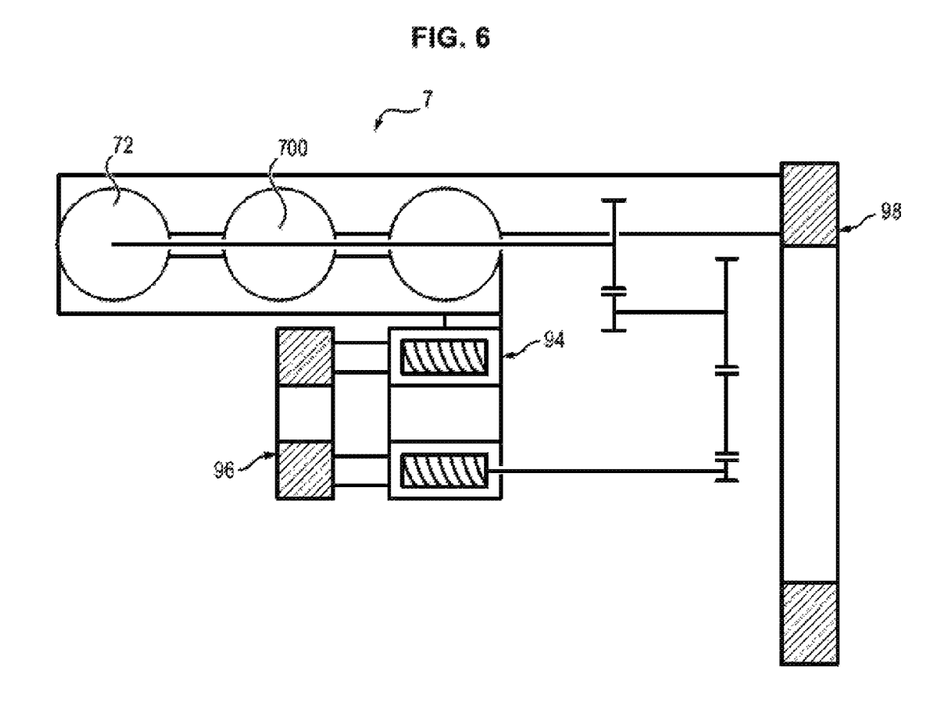
FIG. 6 is a sectional view of the portion of a turbomachine illustrated in FIG. 5.

In one embodiment illustrated in FIGS. 5 and 6, the architecture of the piston engine 7 is called "opposed-piston" architecture. Indeed, this architecture offers a greater compactness, and facilitates the integration of the piston engine 7 within the turbomachine 1. In this configuration, two pistons 72, preferably rotationally cylindrical, linearly slide in the same shell 70, itself preferably rotationally cylindrical. Thus, they define therebetween the variable-volume piston chamber 74. In this embodiment, the piston engine 7 then comprises twice as much pistons 72 as shells 70 or variable-volume piston chambers 74. In a preferred manner, the piston engine 7 then comprises a plurality of stages, each stage comprising four shells 70 within which eight pistons 72 are movable so as to rotate four crankshafts 700. Advantageously, each stage is disposed between the primary stream 4 and the secondary stream 5, for example in the space between the compressor(s) 30 of the high-pressure spool 2 and low-pressure spool 3 casing. The crankshafts 700 then extend along a direction substantially parallel to the longitudinal axis X-X.

Operation of the Turbomachine

In operation, the air taken by the fan 10 is distributed between a primary stream 4 circulating through the high-pressure spool 2 and the low-pressure spool 3, and a secondary stream 5 circulating around the high-pressure spool 2 and the low-pressure spool 3. The primary stream 4 is compressed through the compressor(s) 20, 30, then combusted within the isobaric combustion chamber 40, to be finally expanded in the turbines 50, 60. The turbines 50, 60 drive in rotation both the fan 10 and the compressor(s) 20, 30.

In operation, air is also taken within the variable-volume piston chamber 74, for example by means of the intake duct 76, then compressed by the movement of the piston 72 inside the shell 70. Fuel is then injected into the secondary combustion chamber 74, for example by the injection nozzle(s). When the piston engine 7 is a diesel engine, or a Wankel-type engine, the fuel auto-ignites, which creates a release of heat leading to a large increase in the pressure of the gases present in the variable-volume piston chamber 74. When the piston engine 7 is a gasoline engine, the fuel is ignited thanks to the spark plugs. In any case, this controlled and discrete ignition leads to a pressure increase which allows the gases to move the piston 72 in the shell 70, which causes an expansion of the mixture, which is subsequently discharged from the variable-volume piston chamber 74, for example by means of the discharge duct 78. The combustion engine 7 is configured to repeat such an operating cycle as many times as necessary, as long as the air and fuel supply is ensured. The repetition of this cycle leads to a periodic movement of the piston 72 at an operating speed which depends in particular on the average air flow rate circulating within the variable-volume piston chamber 74.

In operation, air and/or gases is/are, moreover, taken within the isobaric combustion chamber 40. These gases can come entirely from the discharge circuit 78 of the piston engine 8, or only partly, the other portion being conveyed by means of the primary air circulation duct 6. In any case, the gases are also mixed with fuel and then auto-ignite in an uncontrolled and continuous manner, in particular depending on the pressure conditions prevailing within the isobaric combustion chamber at the time of the fuel injection. The gases are then expanded within the turbine 50, which rotates the turbine shaft 500.

The mechanical power supply of the piston engine 7 therefore allows relieving the turbine 50 by decreasing its expansion ratio, that is to say the total pressure ratio between the upstream and the downstream of the turbine 50, which offers many advantages. First, it is possible to reduce the number of stages of the turbine 50, which reduces the mass thereof. Furthermore, the temperature downstream of the turbine 50 is higher, which gives more energy potential to the air flow passing therethrough. Thus, when the turbomachine 1 comprises a fan turbine 60, as can be seen in FIGS. 2 to 4, it is possible to reduce the number of stages of the fan turbine 60.

Position of the Combustion Engine

The position of the combustion engine 7 downstream of the compressor 30, and upstream of the isobaric combustion chamber 40, as illustrated in FIGS. 2 to 4, offers numerous advantages. First, the air density is very high at the inlet of the piston engine 7, which maximizes the mass of air injected into the piston engine 7, and therefore its power for a given volume of the shell 70. In addition, the temperature of the gases in the variable-volume piston chamber 74 is higher than the temperature of the air downstream of the compressor 30. Thus, the temperature difference between the upstream and the downstream of the isobaric combustion chamber 40 is lower than in a conventional turbomachine. Consequently, the thermal efficiency of the isobaric combustion chamber 40 is improved, and the amount of fuel used by the isobaric combustion chamber 40 is reduced. This is all the more true in some advantageous configurations of the thermodynamic cycle of the turbomachine 1, such as those where the compression ratio is low, and the combustion is 40% isochoric and 60% isobaric.

However, this positioning of the piston engine 7 is not limiting. Indeed, when the turbomachine comprises an additional compressor 20 and a fan turbine 60, it is also conceivable to dispose the piston engine 7 downstream of the additional compressor and upstream of the compressor 30, so that the air taken within the variable-volume piston chamber 74 comes from the additional compressor, and that the gases derived from the variable-volume piston chamber 74 are discharged toward the compressor 30.

Transmission Mechanism

As can be seen in FIGS. 2 to 4, the turbomachine further comprises a transmission mechanism 8 comprising:

- a first rotary part 81 connected to the compressor shaft 300,
- a second rotary part 82 connected to the crankshaft 700, and
- a third rotary part 83 connected to the turbine shaft 500.

The rotary parts 81, 82, 83 cooperate with each other so as to transmit to the compressor shaft 300 a rotational movement at a first velocity V1 which depends:

- on a second rotational velocity V2 of the crankshaft 700, and
- on a third rotational velocity V3 of the turbine shaft 500.

Advantageously, the third rotary part 83 can also be connected to an auxiliary power device (not represented), for example configured to produce electrical energy useful to the control units and/or to the actuators of the turbomachine 1 and/or to the electrical equipment of an aircraft on which the turbomachine 1 is likely to be mounted. This is however not limiting since the third rotary part 83 can also be connected to the fan turbine shaft 100, with the same effects of decreasing the expansion ratio and the number of fan turbine 60 stages.

Advantageously, the transmission mechanism 8 is a dual-input differential, corresponding to the second rotary part 82 and to the third rotary part 83, and a single-output differential, corresponding to the first rotary part 81. Indeed, it is a transmission mechanism particularly suitable for the transmission of rotational velocities between several rotating elements at different speeds and independent of each other. In a preferred manner, as illustrated in FIGS. 2 to 4, the transmission mechanism 8 comprises a first epicyclic gear train. Indeed, such a transmission mechanism 8 offers the advantage of robustness and ease of integration within the turbomachine 1. This is however not limiting, since the transmission mechanism 8 may also comprise a magnetic reduction gear and/or a hydraulic reduction gear and/or a centrifugal-connection reduction gear.

In any case, the transmission mechanism 8 induces a constant torque ratio between the turbine 50 and the piston engine 7. This ratio may, for example, depend on the diameters of the rotary parts of the differential transmission mechanism 8. Thus, the torque provided by the turbine 50 and the speed of the turbine 50 affect the speed of the piston engine 7 so as to ensure the continuity of the medium air flow rate within the turbomachine 1, while maintaining a law for changing the compressor speed 30 that can be independent. In any case, the speed of the piston engine 7 is also affected by the rate of injection of the fuel within the variable-volume piston chamber 74.

In one embodiment illustrated in FIG. 4, the crankshaft 700 meshes with the second rotary part 82 by means of an intermediate reduction wheel 820 in order to ensure that the rotational velocity V2 of the crankshaft 700 is different from the rotational velocity of the second rotary part. The intermediate wheel 820 then causes a reduction with the transmission mechanism 8 and a multiplication with the crankshaft 700.

Epicyclic Gear Train

With reference to FIGS. 2 to 4, the first epicyclic gear train comprises a first ring gear 82 and a first sun gear 81. In a preferred manner, the first ring gear 82 forms the second rotary part 82 of the transmission mechanism 8, and the first sun gear 81 forms the first rotary part 81 of the transmission mechanism 8. This configuration has the advantage of easy integration within the turbomachine 1. This configuration is however not limiting, since it is also possible that:

- the first ring gear forms:
  - the first rotary part 81 of the transmission mechanism 8, and is thus connected to the compressor shaft 300, or
  - the third rotary part 83 of the transmission mechanism 8, and is thus connected to the turbine shaft 500, and/or
- the first sun gear forms:
  - the second rotary part 82 of the transmission mechanism 8, and is thus connected to the crankshaft 700, or
  - the third rotary part 83 of the transmission mechanism 8, and is thus connected to the turbine shaft 500.

FIG. 2 illustrates a first embodiment of the preferred configuration of the first epicyclic gear train 8. In this first embodiment, the first epicyclic gear train 8 comprises a first planet carrier 83, and the first planet carrier 83 forms the third rotary part 83 of the transmission mechanism 8, connected to the turbine shaft 500.

FIG. 3 illustrates a second embodiment of the preferred configuration of the first epicyclic gear train. In this second embodiment, the first epicyclic gear train also comprises a first planet carrier 831. However, the transmission mechanism 8 further comprises a reduction gear 830 including the third rotary part 83. The first planet carrier 831 is then connected to the turbine shaft 500 via the reduction gear 830. The presence of the reduction gear 830 makes it possible to maintain an aerodynamic load level of the turbine 50 compatible with the conventional dimensions of a turbomachine 1. Indeed, the speed of the turbine 50 can be greatly decreased with the coupling between the piston engine 7 and the compressor 30. Thanks to the reduction gear 830, the speed of the turbine 50 can be maintained at acceptable levels. Advantageously, as can be seen in FIG. 3, the reduction gear 830 is a second epicyclic gear train 830 comprising:

a second ring gear 832 connected to the first planet carrier 831 as can be seen in FIG. 3, or a second planet carrier 833 meshing with a second ring gear 834 connected to the first planet carrier 831 as can be seen in FIG. 4, and a second sun gear 83 forming a third rotary part 83 and connected to the turbine shaft 500.

Advantageous Embodiments

Advantageous embodiments of a turbomachine 1 as previously described will now be detailed. Indeed, the Applicant has noticed that the specific fuel consumption of a turbomachine 1 designed according to the following embodiments, taken alone or in combination, decreases between 10 and 15% compared to a turbomachine known from the prior art.

In one embodiment, the turbomachine 1 is configured to be mounted on a short or medium-haul type aircraft that is to say of the type developing a thrust comprised between 100 and 135 kN.

In one embodiment, a bypass ratio of the turbomachine 1 is comprised between 12 and 18.

In the following, by "cruising operation" is meant an operation of the turbomachine 1 at a cruising altitude that is to say about 35,000 feet, for a velocity of about Mach 0.8, when the fan shaft 100 operates at a reduced speed of about 85%. By "about" is meant to within 5%. By "reduced speed" is meant the absolute rotational speed of the fan shaft 100 divided by the square root of the ratio of a temperature taken at an inlet of the turbomachine 1 to a reference temperature, for example 731.15 K.

In one embodiment, a compression ratio of the fan 10 during cruising operation is comprised between 1.3 and 1.5. In this embodiment, the turbomachine 1 also comprises a rectifier (not represented), extending within the secondary stream 5, downstream of the fan 10. The compression ratio of the fan 10 is determined on average over the entire stream sucked by the fan 10, between a point upstream of the fan 10, for example at an upstream end of a leading edge of the fan 10, and a point of the secondary stream 5 downstream of the rectifier, for example at a downstream end of a trailing edge of the rectifier. In this embodiment, the compression ratio of the fan 10 is substantially the same, to within 5%, during a takeoff operation, that is to say at sea level, at Mach zero, and full power.

In one embodiment, a compression ratio of the compressor 30 is comprised between 7 and 30, preferably between 15 and 25. By "compression ratio" is meant a ratio of a total pressure at an input interface of the compressor 30 to a total pressure at an output interface of the compressor 30. Thus, in one embodiment, the compression ratio of the high-pressure compressor 30 is comprised between 7 and 30, preferably between 15 and 25.

In one embodiment, the speed of the fan 10 during cruising operation is comprised between 2,500 and 4,000 revolutions per minute.

In one embodiment, a peripheral velocity of the fan 10 is comprised between 300 and 420 meters per second.

In one embodiment, the speed of the compressor 30 is comprised between 15,000 and 20,000 revolutions per minute. Thus, in one embodiment, the speed of the high-pressure compressor 30 is comprised between 15,000 and 20,000 revolutions per minute.

In one embodiment illustrated in FIG. 4, the turbomachine 1 comprises a heat exchanger 90 disposed upstream of the piston engine 7, for example between the high-pressure compressor 30 and the piston engine 7. The heat exchanger 90 advantageously makes it possible to reduce the temperature of the air taken within the piston engine 7 with a view to reducing the thermal loads within said piston engines 7, but also to increase the density of the taken air and, thus, to increase the thermal efficiency of the piston engine 7.

In one embodiment also illustrated in FIG. 4, the piston engine 7 is itself cooled, for example by means of an air-oil exchanger 92, in order to decrease the thermal loads within said piston engines 7.

With reference to FIGS. 4 to 6, in one embodiment, when the piston engine 7 operates in two-stroke mode, the turbomachine 1 further comprises a positive-displacement pump 94, for example a lobe pump, configured to increase the intake pressure within the piston engine 7. In this way, the intake pressure within the piston engine 7 is systematically greater than the exhaust pressure from the piston engine 7. Therefore, this ensures the suppression of a reverse flow within the piston engine 7. Advantageously, the positive-displacement pump 94 is also driven by the transmission mechanism 8, for example by being connected to the first rotary part 81 as can be seen in FIG. 4. In addition, the positive-displacement pump is disposed upstream of the piston engine 7.

Still referring to FIGS. 4 to 6, in one embodiment, the turbomachine further comprises a first plenum chamber 96 configured to facilitate the passage from a continuous flow at the outlet of the compressor 30 to a discontinuous flow at the inlet of the piston engine 7, and/or a second plenum chamber 98 configured to facilitate the passage from a discontinuous flow at the outlet of the piston engine 7 to a continuous flow at the inlet of the turbine 50. The first plenum chamber 96 is advantageously disposed upstream of the piston engine 7, for example between the exchanger and the lobe pump, while the second plenum chamber 98 is advantageously disposed upstream of the turbine 50. Thanks to the plenum chambers 96, 98, the continuity of the average air flow rate between the upstream and the downstream of the piston engines 7 is ensured.

In one embodiment, the piston engine 7 has dimensions such that the excess air taken by the variable-volume piston chamber 74 is comprised between 4 and 12, preferably comprised between 8 and 12. The excess air corresponds, for a given operating cycle of the piston engine 7, to the image, for a given fuel mass injected within the variable-volume piston chamber 74, of the excess air with respect to the stoichiometric air mass necessary for the complete combustion of the fuel mass. Thus, an excess air 2 corresponds to the intake of an air mass twice the stoichiometric air mass necessary for the combustion of the entire fuel mass injected. Excess air is required to ensure that sufficient oxygen remains in the gases derived from the variable-volume piston chamber 74 for a combustion within the isobaric combustion chamber 40 to take place. The Applicant has noticed that an excess air comprised between 4 and 12 was particularly advantageous in this regard. When air is collected upstream of the piston engine 7 to be reintroduced into circuits for venting (not represented) the blades of the turbine 50 in order to cool said blades, it is necessary that the pressure of the collected air is greater than the pressure prevailing in the secondary stream 4, at the turbine 50. The pressure prevailing in the secondary stream 4, at the turbine 50, being substantially identical to the pressure prevailing in the isobaric combustion chamber 40 (i.e. substantially identical to the pressure at the outlet of the piston engine 7), it is necessary that this outlet pressure is slightly lower than the inlet pressure. For this reason, it is, in this case, necessary to provide an excess air greater than 8.

In one embodiment, when the shell 70 and the piston 72 have a rotational symmetry, for example rotationally cylindrical, the bore of the piston 72 is comprised between 150 and 250 millimeters.

In one embodiment, when the shell 70 and the piston 72 have a rotational symmetry, for example rotationally cylindrical, the stroke of the piston 72 is comprised between 150 and 250 millimeters.

In one embodiment, the volumetric ratio of the piston engine 7 is comprised between 2 and 10, preferably between 2 and 5. By "volumetric ratio" is meant the ratio between the volume at the top dead center and the bottom dead center of the piston 72, during its stroke within the shell 70.

In one embodiment, whatever the operating speed (e.g. cruising and/or take-off and/or landing), the average linear velocity of the piston 72 inside the shell 70 is comprised between 5 and 20 meters per second, preferably between 15 and 20 meters per second.

In one embodiment, whatever the operating speed (e.g. cruising and/or take-off and/or landing), the maximum pressure reached within the shell 70 of the piston engine 7 is comprised between 150 and 250 bars, preferably between 150 and 200 bars.

In one embodiment, a power developed by the piston engine 7, whatever the operating regime (e.g. cruising and/or take-off and/or landing), is comprised between 500 kW and 2 MW.

In one embodiment, a crankshaft speed, whatever the operating speed (e.g. cruising and/or takeoff and/or landing), is comprised between 1,000 and 4,000 revolutions per minute, preferably between 1,500 and 2,500 revolutions per minute.

In one embodiment, a reduction ratio of the first epicyclic gear train 8 is comprised between 2 and 3. By "reduction ratio" is meant the ratio of the number of teeth of the ring gear of the first epicyclic gear train 82 to the number of teeth of the sun gear of the first epicyclic gear train 81.

In one embodiment, a geometric coefficient of the reduction gear 830 is comprised between 1.25 and 2. By "geometric coefficient" is meant the ratio of the number of teeth of the ring gear of the reduction gear 831 to the number of teeth of the sun gear of the reduction gear 81.

The invention claimed is:

1. A turbomachine assembly comprising:
   a compressor,
   a compressor shaft configured to drive in rotation the compressor,
   a piston engine comprising:
      a shell, and
      a piston movably mounted inside the shell and defining with the shell a variable-volume piston chamber,
   a crankshaft configured to be driven in rotation by the piston engine,
   an isobaric combustion chamber,
   a turbine,
   a turbine shaft configured to be driven in rotation by the turbine,
   a fan turbine,
   a fan shaft,
   a fan configured to be driven in rotation by the fan turbine by means of the fan shaft, and
   a differential transmission mechanism comprising:
      a first rotary part connected to the compressor shaft,
      a second rotary part connected to the crankshaft, and
      a third rotary part connected to the turbine shaft,
   wherein the first rotary part, the second rotary part and the third rotary part cooperate so as to transmit to the compressor shaft a rotational movement at a first velocity which depends:
      on a second rotational velocity of the crankshaft, and
      on a third rotational velocity of the turbine shaft.

2. The turbomachine assembly according to claim 1, wherein the differential transmission mechanism comprises a first epicyclic gear train.

3. The turbomachine assembly according to claim 2, wherein the first epicyclic gear train comprises a first ring gear and a first sun gear, the first ring gear forming the second rotary part of the differential transmission mechanism and the first sun gear forming the first rotary part of the differential transmission mechanism.

4. The turbomachine assembly according to claim 3, wherein the first epicyclic gear train comprises a first planet carrier, the first planet carrier forming the third rotary part of the differential transmission mechanism.

5. The turbomachine assembly according to claim 1, wherein the piston engine further comprises:
   an intake duct configured to take air coming from the compressor to the variable-volume piston chamber, and
   a discharge duct configured to discharge gases coming from the variable-volume piston chamber toward the isobaric combustion chamber.

6. The turbomachine assembly according to claim 1, comprising a primary air circulation duct configured to guide air coming from the compressor up to the isobaric combustion chamber.

7. The turbomachine assembly according to claim 1, wherein the piston engine comprises a plurality of shells and a plurality of pistons, each piston being movable within a shell of the plurality of shells, the plurality of shells and the plurality of pistons defining a plurality of variable-volume piston chambers.

8. The turbomachine assembly according to claim 1, further comprising a plenum chamber configured to facilitate a passage from a continuous gas flow through the compressor and/or the turbine to a discontinuous gas flow through the piston engine.

9. A turbomachine comprising the turbomachine assembly according to claim 1.

10. The turbomachine assembly according to claim 1, wherein the fan is configured to take air and distribute it between a primary stream circulating through the compressor, the piston engine, the isobaric combustion chamber, the turbine and the fan turbine, and a secondary stream circulating around the compressor, the piston engine, the isobaric combustion chamber, the turbine and the fan turbine.

11. The turbomachine assembly according to claim 1, wherein the compressor shaft is configured to drive in rotation the compressor about a longitudinal axis of the turbomachine and the turbine shaft is configured to be driven in rotation by the turbine about the longitudinal axis, wherein the crankshaft extends along a direction substantially parallel to the longitudinal axis.

12. A turbomachine assembly comprising:
a compressor;
a compressor shaft configured to drive in rotation the compressor;
a piston engine comprising a shell and a piston movably mounted inside the shell and defining with the shell a variable-volume piston chamber;
a crankshaft configured to be driven in rotation by the piston engine;
an isobaric combustion chamber;
a turbine;
a turbine shaft configured to be driven in rotation by the turbine; and
a differential transmission mechanism comprising a first rotary part fixed to the compressor shaft, a second rotary part fixed to the crankshaft, and a third rotary part connected to the turbine shaft;
wherein the first rotary part, the second rotary part and the third rotary part cooperate so as to transmit to the compressor shaft a rotational movement at a first velocity which depends on a second rotational velocity of the crankshaft and on a third rotational velocity of the turbine shaft;
wherein the differential transmission mechanism comprises a first epicyclic gear train; and
wherein the first epicyclic gear train comprises a first ring gear and a first sun gear, the first ring gear forming the second rotary part of the differential transmission mechanism and the first sun gear forming the first rotary part of the differential transmission mechanism.

13. A turbomachine assembly comprising:
a compressor;
a compressor shaft configured to drive in rotation the compressor;
a piston engine comprising a shell and a piston movably mounted inside the shell and defining with the shell a variable-volume piston chamber;
a crankshaft configured to be driven in rotation by the piston engine;
an isobaric combustion chamber;
a turbine;
a turbine shaft configured to be driven in rotation by the turbine; and
a differential transmission mechanism comprising a first rotary part fixed to the compressor shaft, a second rotary part fixed to the crankshaft, and a third rotary part connected to the turbine shaft;
wherein the first rotary part, the second rotary part and the third rotary part cooperate so as to transmit to the compressor shaft a rotational movement at a first velocity which depends on a second rotational velocity of the crankshaft and on a third rotational velocity of the turbine shaft;
wherein the differential transmission mechanism comprises a first epicyclic gear train; and
wherein the first epicyclic gear train comprises a first planet carrier, and the differential transmission mechanism comprises a reduction gear including the third rotary part, the first planet carrier being connected to the turbine shaft via the reduction gear.

* * * * *